(12) United States Patent
Wallace et al.

(10) Patent No.: US 9,626,383 B2
(45) Date of Patent: Apr. 18, 2017

(54) MANAGING DIGITAL IMAGES

(71) Applicant: Apple Inc., Cupertino, CA (US)

(72) Inventors: Alexander David Wallace, Sunnyvale, CA (US); Laurent Perrodin, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/175,299

(22) Filed: Feb. 7, 2014

(65) Prior Publication Data

US 2014/0153845 A1 Jun. 5, 2014

Related U.S. Application Data

(62) Division of application No. 11/850,815, filed on Sep. 6, 2007, now Pat. No. 8,687,924.

(60) Provisional application No. 60/846,830, filed on Sep. 22, 2006.

(51) Int. Cl.
| | |
|---|---|
| *G06K 9/60* | (2006.01) |
| *G06K 9/03* | (2006.01) |
| *H04N 1/00* | (2006.01) |
| *G06F 12/00* | (2006.01) |
| *G06F 17/30* | (2006.01) |
| *G06T 11/60* | (2006.01) |

(52) U.S. Cl.
CPC .... *G06F 17/3028* (2013.01); *G06F 17/30132* (2013.01); *G06F 17/30265* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 8,150,807 B2 | 4/2012 | Fredlund | |
| 2006/0127079 A1* | 6/2006 | Sasaki | 396/105 |
| 2007/0040928 A1* | 2/2007 | Jung et al. | 348/362 |
| 2011/0110568 A1 | 5/2011 | Vesper | |
| 2012/0173673 A1 | 7/2012 | Dietrich | |

OTHER PUBLICATIONS

Adobe Photoshop 7.01 Aug. 2002, Screen Shots and Help file.

* cited by examiner

*Primary Examiner* — Randolph I Chu
(74) *Attorney, Agent, or Firm* — Blank Rome LLP

(57) ABSTRACT

Approaches for managing a library of digital images and information about any editing operations performed on those digital images are provided. A managed library of digital images and a referenced library of digital images may be maintained. Digital images may be moved from the managed library of digital images to the referenced library of digital images, and vice-versa. A preview digital image data may also be generated from master digital image data. Rather than performing image operations directly on the master digital image data, change data that identifies one or more operations to perform to a digital picture represented by either the preview digital image data or the master digital image data may be stored, thereby allowing operations to be performed on the preview digital image data when the master digital image data is not accessible. Digital image may be automatically renamed based on rules for doing so.

20 Claims, 7 Drawing Sheets

MANAGING DIGITAL IMAGES

CROSS-REFERENCE TO RELATED APPLICATIONS

This is a division of U.S. patent application Ser. No. 11/850,815, by Alexander David Wallace and Laurent Perrodin, entitled Managing Digital Images, filed Sep. 6, 2007, which is a non-provisional of U.S. Provisional Patent Application 60/846,830, by Nikhil Bhatt, et al., entitled Architecture For Image Manipulation, filed Sep. 22, 2006, both of which are incorporated by reference herein in their entirety.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital image management applications may be used to manage a collection of digital images. Digital image management applications may be used to store and retrieve digital images to and from a storage medium, such as a hard drive. However, some digital image management applications are limited on how many digital images they can manage because all of the digital images managed by the application must be stored on the storage medium. As a result, the number of digital images that a digital image management application can manage may be limited by the size of the storage medium.

Certain digital image management applications may also be used to perform an edit operation on a digital image that causes a change in a visual characteristic of the digital image. When an application performs an edit operation on a digital image, the application typically creates, based on the existing digital image, a new digital image that reflects the performance of the edit operation. Thus, after performing the edit operation, not only is the prior digital image stored on the storage medium, but also the new digital image that reflects the performance of the edit operation. Consequently, editing digital images in this manner exacerbates the limitations of a digital image management application as ample space must be available on the storage medium to store, in addition to the original digital images, the results of any edit operations performed on the digital images managed by the digital image management application.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
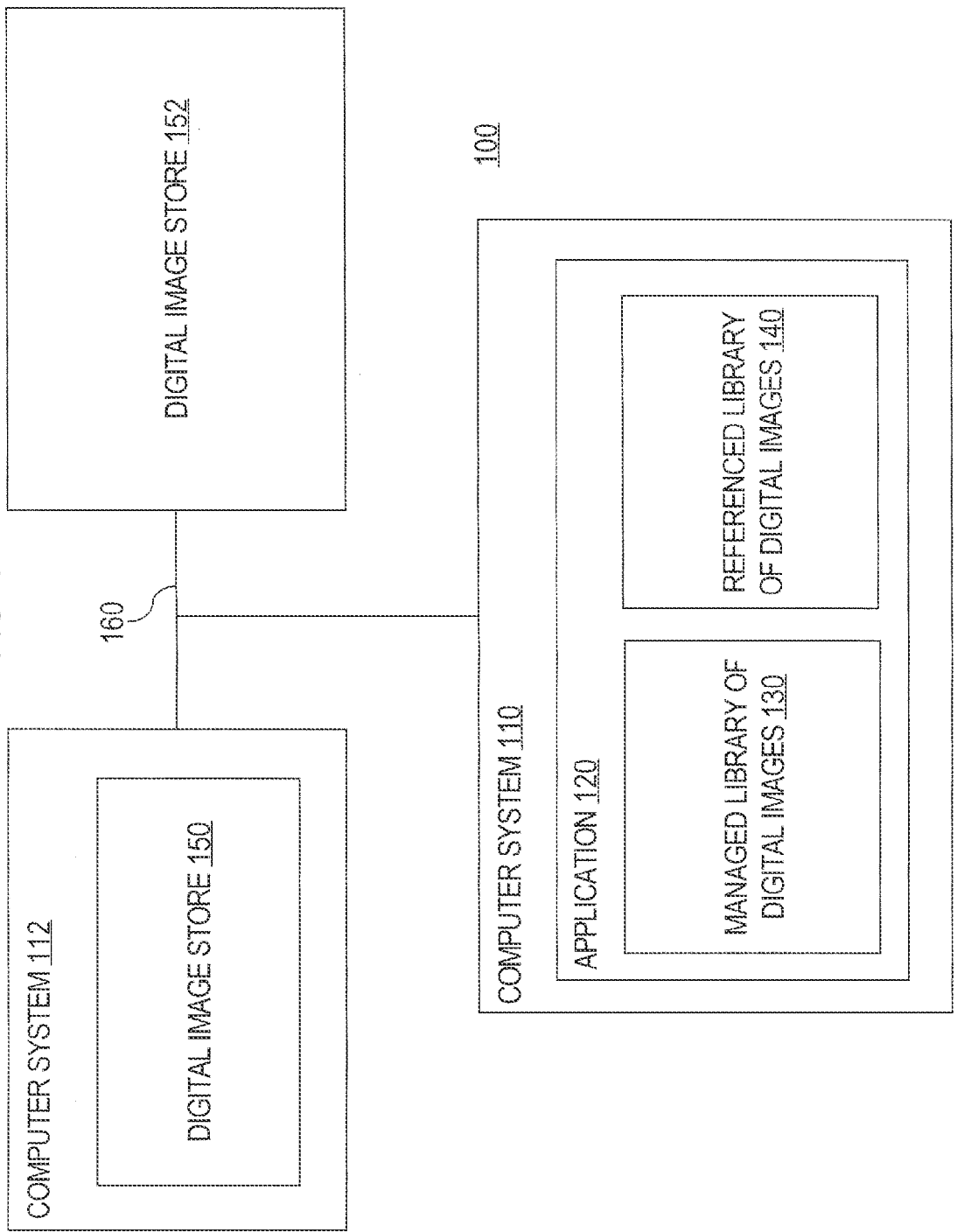
FIG. 1 is a block diagram of a system according to an embodiment of the invention.

In the following description, for the purposes of explanation, numerous specific details are set forth in order to provide a thorough understanding of the embodiments of the invention discussed herein. It will be apparent, however, that the embodiments of the invention discussed herein may be practiced without these specific details. In other instances, well-known structures and devices are shown in block diagram form in order to avoid unnecessarily obscuring the embodiments of the invention discussed herein.

In the common vernacular, a digital picture or digital image may either refer to an image file that may be processed to display an image or the actual image itself. As used herein, digital image data refers to digital data that may be processed to display a digital image or digital picture. For example, non-limiting, illustrative examples of digital image data include a .BMP file, a .JPEG file, a .TIF file, or a .GIF file. Thus, a digital image or a digital picture is the visual display of digital image data. However, in contexts where the distinction between the visual image rendered from digital image data and the digital image data itself is not important to understand how the embodiment of the invention works, a reference to a digital image or digital picture may follow the common vernacular and implicitly include reference to the digital image data used to display the digital image or digital picture. For example, a description of "storing a digital image" at a particular location refers to storing digital image data, which when processed causes the display of the digital image, at the particular location.

Functional Overview

Embodiments of the invention advantageously provide techniques for managing a collection of digital images and information about any editing operations performed on those digital images. For example, in an embodiment, non-destructive digital image editing may be performed. In such an embodiment, preview digital image data is generated from master digital image data, where the preview digital image data represents a lower quality version of a digital picture represented by the master digital image data. The preview digital image data may be used to display the digital picture, rather than the master digital image data, in some circumstances to facilitate a faster display. Rather than making a request to perform a modification to the digital picture by updating the master digital image data, change data that identifies one or more operations to perform to the digital picture is stored. A result of performing a requested operation to the digital image may be shown to a user by displaying a digital image obtained by applying the change data to the preview digital image data. In this way, neither the master digital image data nor the preview digital image data need be modified to perform an edit operation on the digital picture. Such an approach yields numerous advantages, e.g., the result of performing the edit operation may be digitally stored using less space than prior approaches.

According to another embodiment of the invention, a digital image may be automatically renamed when being imported into a library of digital images. The digital image may be renamed based on one or more rules that are established by a user. The one or more rules may also be used to create, at least of portion of, a folder hierarchy and store a copy of the imported digital image in the portion of the folder hierarchy.

In another embodiment of the invention, locations of digital images managed by an application may be tracked with greater precision than by prior approaches. In response to the application determining that a first digital image of a plurality of digital images is currently stored at a different location than an initial location of the first digital image, the application updates data that identifies that the plurality of digital images are each currently stored at a new location. To illustrate how an embodiment may be employed, assume that an application stores data that identifies where each of a plurality of digital images are stored. Using such an embodiment, if a user moves a digital image to a different location in a digital image store while the digital image store is inaccessible to the application, then when the digital image stores becomes accessible to the application, the application may reconcile the present location of the digital image with the location at which the application expected the digital image to reside. In this way, the application will not treat a moved digital image, at its new location, as a new digital image that the application has not previously encountered.

Other embodiments of the invention enable an application to manage digital images that are either stored in a managed library of digital images or a referenced library of digital images. A managed library of digital images stores a copy of a digital image in the managed library, whereas the referenced library of digital images store a reference to a digital image in the referenced library. Embodiments of the invention enable digital images, which are managed by the application, to be moved from the managed library to the referenced library, and vice-versa.

In another embodiment of the invention, in response to detecting that a particular storage device, of a plurality of storage devices, that was previously accessible is presently inaccessible, location data that identifies on which storage device, of a plurality of storage devices, each of a plurality of digital images are stored is accessed to determine which digital images are stored on the particular storage device. Thereafter, information that indicates that at least of portion of the digital images that are stored on the particular storage device are inaccessible is displayed to a user. In this way, once a determination is made that a particular storage device is inaccessible, the set of digital images stored thereon that are inaccessible may be immediately known to the user without a determination being made, for each digital image of the plurality of digital images, as to whether the digital image is accessible or not, thereby saving time and resources.

These and other embodiments of the invention shall be discussed in greater detail below.

Architecture Overview

FIG. 1 is a block diagram of a system 100 according to an embodiment of the invention. In an embodiment, system 100 includes computer systems 110 and 112, digital image store 150 and 152, and communications link 160. While only two computer systems are depicted in system 100, other embodiments of the invention may contain any number of computer systems. At least one computer system in system 100 executes application 120, although application 120 may be executed on more than one computer system. Additionally, any number of digital image stores may reside, but need not reside, on a computer system, and any number of computer systems containing digital image stores may be comprised within system 100.

Computer system 110 executes application 120. Application 120 may be implemented by software that is configured to manage, store, or edit digital images. For example, in an embodiment, application 120 may perform the steps illustrated in one or more of FIGS. 2-6. The functions performed by application 120 shall be discussed in greater detail below.

In an embodiment, application 120 may comprise managed library of digital images 130 and referenced library of digital images 140. Managed library of digital images 130 stores a copy of each digital image in the managed library. Referenced library of digital images 140 stores a reference to where each digital image in the referenced library is located. For example, digital image data for a first digital image may be stored in digital image store 150 and digital image data for a second digital image may be stored in digital image store 152. Referenced library of digital images 140 may store a first reference to the location in digital image store 150 where digital image data for the first digital image is stored and store a second reference to the location in digital image store 152 where digital image data for the second digital image is stored.

Note that while application 120 is depicted in FIG. 1 as comprising managed library of digital images 130 and referenced library of digital images 140, in other embodiments of the invention, application 120 may comprise only one of managed library of digital images 130 and referenced library of digital images 140. In other embodiments of the invention, application 120 may not comprise either managed library of digital images 130 or referenced library of digital images 140. As a result, the presence of managed library of digital images 130 and referenced library of digital images 140 in system 100 is optional.

In an embodiment, computer system 112 comprises digital image store 150. A digital image store, such as digital image store 150 and 152, refers to any volatile or non-volatile storage medium that is capable of storing digital image data. A digital image store may be implemented on a computer system (such as digital image store 150). Such a digital image store may include a database, a file system, an operating system, and any other software executing on computer system 112 which may be used to store digital images. A digital image store may not be implemented on what is traditionally considered a computer system (such as digital image store 152), e.g., such a digital image store may correspond to a flash memory card, a cell phone, a personal digital assistant (PDA) or any other device which enables the storage of digital images.

Communications link 160 may be implemented by any medium or mechanism that provides for the exchange of data between computer systems and/or between a computer system and a digital image store. Examples of communications links 160 include, without limitation, a network such as a Local Area Network (LAN), Wide Area Network (WAN), Ethernet or the Internet, or one or more terrestrial, satellite or wireless links. Although not shown in FIG. 1, digital image store 152 and/or computer system 112 may be physically connected to computer system 110 to enable communications therewith, e.g., if digital image store 152 is a portable disk drive, the portable disk drive may be physically connected to computer system 110 for purposes of enabling communications between digital image store 152 and computer system 110.

Having described an illustrative system according to an embodiment of the invention, an approach for performing non-destructive digital image editing according to an embodiment of the invention will now be discussed.

Non-Destructive Digital Image Editing

Figure 2:
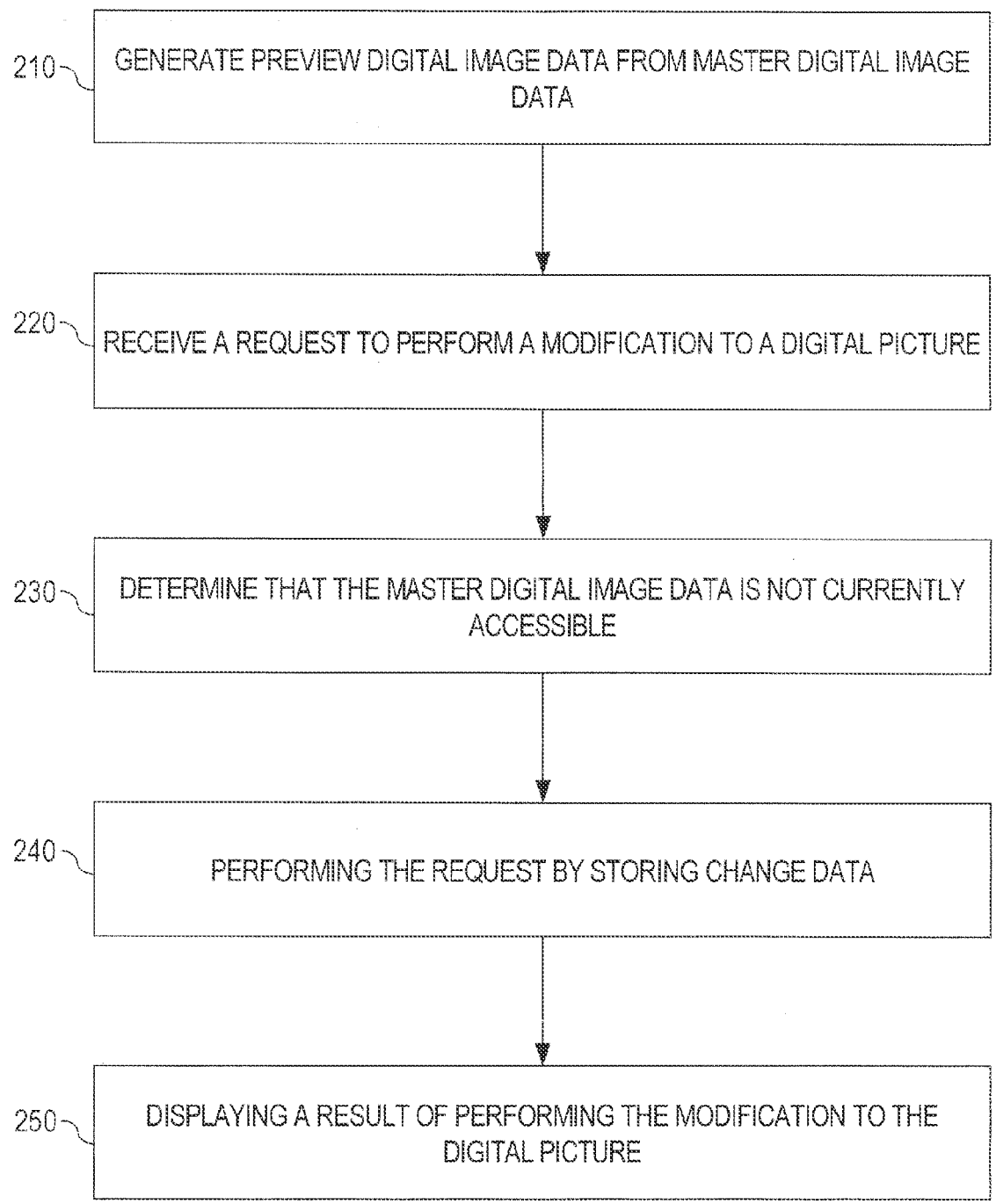
FIG. 2 is a flowchart illustrating the functional steps of editing a digital image according to an embodiment of the invention.

FIG. 2 is a flowchart illustrating the functional steps of editing a digital image according to an embodiment of the invention. By performing the steps illustrated by FIG. 2, embodiments of the invention may edit a digital image without making any changes to the original digital image. Further, any changes made to a digital image may be undone at any time.

Initially, in step 210, preview digital image data is generated from master digital image data. Master digital image data represents the original digital image data that represents a digital picture. For example, when a photographer takes a picture with a digital camera, the digital camera will create master digital image data for each digital picture taken by the digital camera. Master digital image data will typically represent a high quality version of a digital picture, e.g., the digital camera may be configured to take digital pictures at a high degree of resolution. As a result, the processing of master digital image data by application 120 to display the digital picture represented by the master digital image data may be resource intensive.

Consequently, in step 210, application 120 creates preview digital image data from the master digital image data. Preview digital image data represents the same digital picture as the master digital image data used to create the preview digital image data. However, preview digital image data represents a lower quality version of the digital picture represented by the master digital image data. Since the preview digital image data represents a lower quality version of the digital picture, it takes fewer resources of application 120 to process the preview digital image data to display the digital picture represented by the preview digital image data than compared to processing the corresponding master digital image data. In an embodiment, after application 120 creates the preview digital image data for a particular digital image, anytime application 120 needs to display the particular digital image, application 120 does so by processing the preview digital image data to display the particular digital image to save resources.

In step 220, a request to perform a modification to a digital picture is received. The request may be received by application 120. For example, a user may configure a graphical user interface provided by application 120 to instruct application 120 to perform a modification to a particular digital picture. For example, step 220 may be performed by a user instructing application 120 to perform a crop operation on a particular digital image.

In step 230, a determination is made that master digital image data for the digital picture is not currently accessible. To illustrate, application 120 may store location data that identifies a location where master digital image data, for each digital image managed by application 120, is stored. Such a location for the master digital image data may either by in managed library of digital images 130 or in a location in a digital image store identified by referenced library of digital images 140. In step 230, application 120 may determine that a digital image store which stores the master digital image data that represents the digital picture which is the subject of the requested modification is not currently accessible by application 120. For example, a photographer may store in the master digital image data in a removable hard drive or in a portable computer which is not operationally connected via a network (such as communications link 160) to application 120. In an embodiment, master digital image data may only become inaccessible if the master digital image data was stored in a location identified by referenced library of digital images 140. Note that step 230 is optional, as there is no requirement that master digital image data for the digital picture be inaccessible.

In step 240, in response to determining that the master digital image data is not currently accessible, application 120 performs the requested modification to the digital picture. In an embodiment, application 120 performs the requested modification to the digital picture by storing change data that identifies one or more operations to apply to the digital picture. When the one or more operations identified by the change data are applied to the digital picture, the requested modification is performed (in addition, as explained in further detail below, any previously requested modifications to the digital picture are also performed). For example, change data may specify that a crop operation is to be performed to the digital picture represented by either the master digital image data or the preview digital image data.

Storing change data does not modify either the master digital image data or the preview digital image data. Thus, the original digital image taken by the photographer need not ever be modified, altered, or changed in any way to perform any modifications to the digital image by embodiments of the invention. For example, the original digital image may be cropped to a reduced size by storing change data that instructs application 120 on how to perform the crop operation to the original digital image, without ever modifying, altering, or changing the original digital image. In an embodiment, change data may specify that more than one operation is to be performed to the digital image. This is so because change data may identify all operations that have been requested to be made to the digital picture. Thus, if two modifications have been requested to be performed to a digital picture, then change data identifies two operations to be applied to the digital picture to result in the performance of the two requested modifications.

In step 250, a result of performing the one or more operations identified by the change data to an image generated based on said preview digital image data is displayed. Application 120 may display the result of performing a requested modification by applying the change data, which identifies operations to be applied to the digital picture to perform all requested modifications to the digital picture received by application 120, to preview digital image data for the digital picture. In this way, application 120 may display, to a user, the result of performing any modification to a digital picture without ever having modified the master digital image data for that digital picture.

In an embodiment where more than one modification has been requested to be made to the digital picture, the performance of step 250 causes the result of performing each requested modification to be displayed.

In an embodiment, if application 120 determines that master digital image data is currently accessible, then application 120 may apply the change data to the image generated based on the master digital image for the digital picture. In this way, the result of performing a modification to a digital image may initially be shown to a user by generating a digital image that displays the result of performing the modification using the preview digital image data, but a later point in time when master digital image data becomes available, the result of performing the modification may be shown to the user by generating a digital image using the master digital image data.

In an embodiment, in order to save the current state of editing a digital image, a user need not issue an express command to application 120 to save the current state of editing a digital image. This is so because application 120 saves change data each time change data is updated to reflect the performance of a new operation to a digital image.

In an embodiment, any operation identified by the change data may be "undone" simply by the user subsequently instructing application 120 that the particular operation is not to be performed. Thus, at any point in time, a user may instruct application 120 to undo a previous edit operation performed to a digital image. For example, since the change data identifies all operations that are to be performed to a digital image relative to either the master digital image data or the preview image data, if the user subsequently changes his or her mind, the user may update the change data so that one of the operations identified by the change data is not performed. As a result, the digital image resulting from applying the change data to the master digital image data or the preview digital image data will not reflect the performance of the operation that the user wishes "undone."

The performance of the steps illustrated in FIG. 2 yield numerous advantages. For example, in an embodiment, the result of performing edit operations may be digitally stored using less space than prior approaches. Further, in an embodiment, changes that are made to a digital image rendered at a lesser degree of resolution (for example, a digital images rendered using preview digital image data) may be automatically performed on a digital image rendered at a higher degree of resolution (for example, when master digital image data becomes accessible to application 120). Additionally, embodiments of the invention may automatically save the current state of editing a digital image.

Having described an approach for performing non-destructive digital image editing, an approach for automatically treating digital images upon the performance of an event (such as importing the digital images into a library of digital images) according to an embodiment of the invention will now be discussed.

Automatic Treatment of Digital Images

Figure 3:
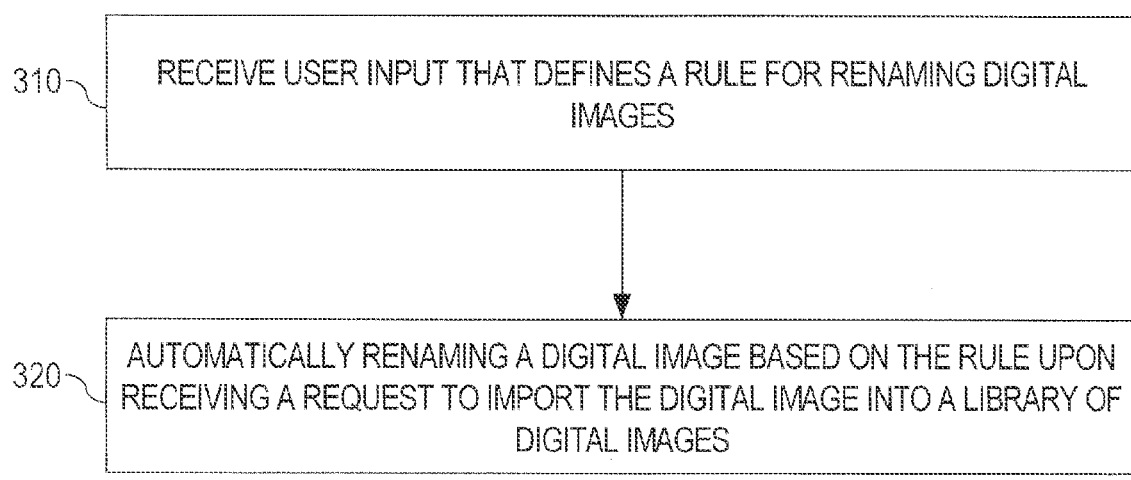
FIG. 3 is a flowchart illustrating the functional steps of importing a plurality of digital images into a storage medium according to an embodiment of the invention.

FIG. 3 is a flowchart illustrating the functional steps of importing a plurality of digital images into a storage medium according to an embodiment of the invention. In step 310, user input, which defines one or more rules for renaming digital images, is received. The user input of step 310 may be received by application 120. For example, the user may define the user input in a graphical user interface provided by application 120.

The one or more rules for renaming digital images may be based on any type of characteristic or criteria. In an embodiment, the one or more rules may be based on one or more of file metadata for the digital images, application metadata for the digital images, and file system metadata for the digital images. File metadata is data that describes characteristics of a digital image. File metadata may be assigned, recorded, or created for the digital image by the entity that creates the digital image, such as a digital camera. A non-limiting, illustrative example of file metadata includes information about a global positioning system (GPS) location associated with the digital camera when the digital image was taken.

Application metadata is data that describes the digital image and is assigned by an application for a digital image. A non-limiting, illustrative example of file metadata includes a given name, assigned by an application, for a digital image. File system metadata is data that describes the digital image and is assigned by a file system for a digital image. A non-limiting, illustrative example of file metadata includes a creation date for the digital image.

To illustrate how a user may perform step 310, a user could use a graphical user interface provided by application 120 to submit user input that defines a rule for organizing digital images into a hierarchy of folders according to a GPS location associated with each digital image. In this way, the user could create a rule that organizes the user's digital images into folders based on the location of where the digital images were taken. In such an embodiment, file metadata that identifies GPS location information for a digital image may be referenced by such a rule.

As another example, a user could use a graphical user interface provided by application 120 to submit user input that defines a rule for renaming digital images based on the creation date of the digital image and whether the digital image is color or black and white.

In an embodiment, a rule for renaming digital images could specify that the new name is composed of a set of portions, and each portion in the name may correspond to a particular characteristic of the digital image. For example, an illustrative rule could specify that digital images should be renamed according to: (Project name for digital image) (Creation date of digital image).

In step 320, application 120 automatically renames a digital image based on the one or more rules of step 310. Step 320 may be performed in response to receiving a request to import the digital image to be renamed into a library of digital images, such as either managed library of digital images 130 or referenced library of digital images 140. Application 120 may perform step 320 in importing a plurality of digital images into either managed library of digital images 130 or referenced library of digital images 140. Thus, each of the plurality of digital images that are imported by application 120 will be renamed according to the one or more rules of step 310 upon being imported into managed library of digital images 130 or referenced library of digital images 140.

While step 320 is being described herein as being performed in response to importing digital images into a library, in other embodiments of the invention, step 320 may be performed in response to other actions, such as receipt of a request to rename a specified set of digital images which are already included in one or more of managed library of digital images 130 and referenced library of digital images 140.

In an embodiment, in addition to renaming digital images, a user may submit user input that defines rules to perform other actions, such as how to store the digital image. As another example, a user could use a graphical user interface provided by application 120 to submit user input that defines a rule for (a) creating a folder hierarchy, and (b) storing copies of digital images in the folder hierarchy. In such an embodiment, upon receiving the request to import a digital image into a library of digital images managed by application 120, application 120 may automatically, based on the set of rules of step 310, create at least of portion of the folder hierarchy specified by the rule and store a copy of the digital image or create a reference to the digital image in the newly created portion of the folder hierarchy. For example, an illustrative rule could specify that digital images should be grouped into folders according to global positioning system (GPS) coordinates or according to project name.

Having described an approach for automatically treating digital images upon the performance of an event, an approach for tracking locations of digital images according to an embodiment of the invention will now be discussed.

Tracking Locations of Digital Images

Figure 4:
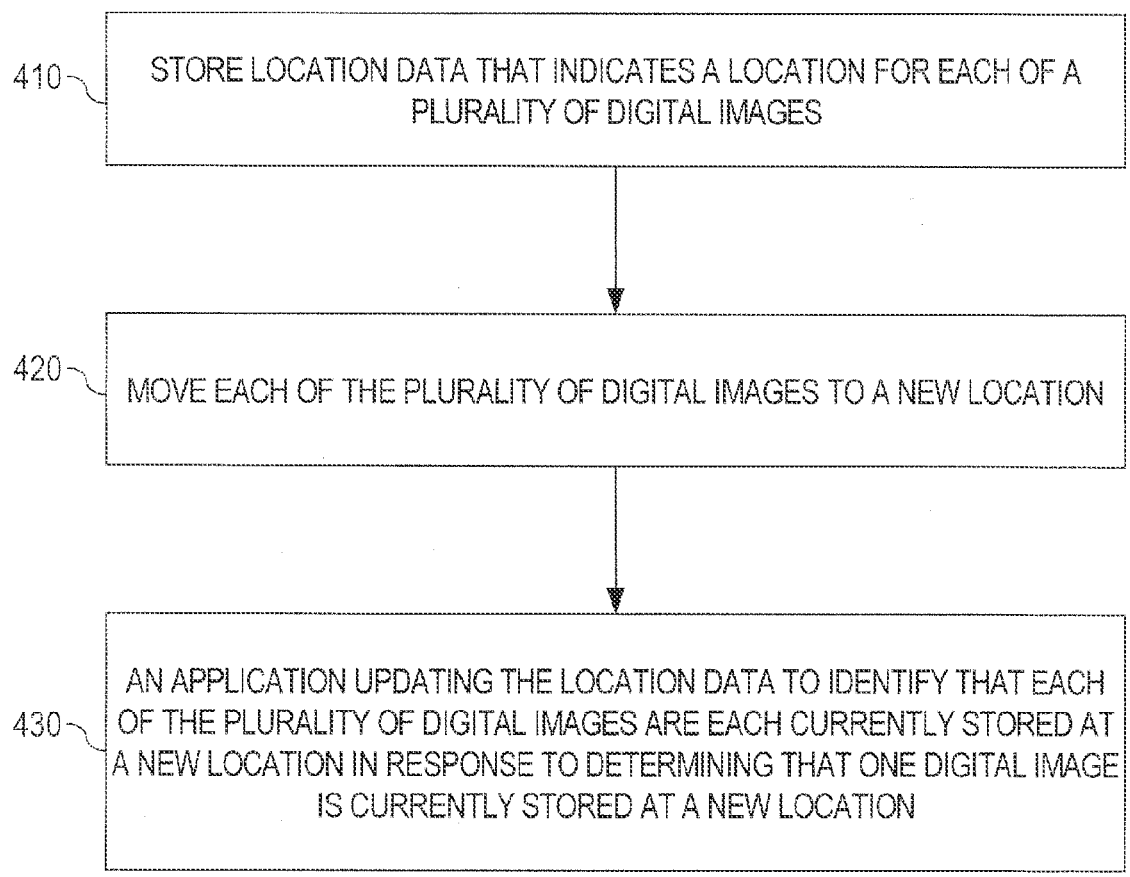
FIG. 4 is a flowchart illustrating the functional steps of tracking locations of digital images according to an embodiment of the invention.

FIG. 4 is a flowchart illustrating the functional steps of tracking locations of digital images according to an embodiment of the invention. By performing the steps of FIG. 4, application 120 will not treat a digital image managed by either managed library of digital images 130 or referenced library of digital images 140 that has been moved to a new location as a new digital image that application 120 has not previously encountered. This feature is particularly useful when the digital image is moved at a point in time when the digital image is not accessible to application 120, e.g., the digital image is moved when the digital image is stored in digital image store 150 when digital image store 150 is currently offline or unreachable to computer system 110.

In step 410, location data that indicates a location for each of a plurality of digital images is stored. In an embodiment, the location data of step 410 may be stored by application 120. The location data may indicate a location for each of a plurality of digital images in either managed library of digital images 130, referenced library of digital images 140, or both.

For example, a photographer may wish to work on location for an extended period. As such, the photographer may wish to move master digital image data for a plurality of digital images from managed library of digital images 130 to his laptop computer (which corresponds to computer system 112 in this example). Thus, the photographer may move master digital image data for the plurality of digital images from managed library of digital images 130 to digital image store 150. Upon doing so, location data, maintained by application 120, is updated to reflect that master digital image data for each of the plurality of digital images is now stored at digital image store 150. Additionally, in an embodiment, the location data may further identify the particular location at digital image store 150 where master digital image data for each digital image of the plurality of digital images is stored. For example, the location data may identify a particular folder or path where master digital image data for each digital image of the plurality of digital images is stored at digital image store 150. In effect, the photographer has moved the responsibility for managing master digital image data for these digital images from managed library of digital images 130 to referenced library of digital images 140 (a process explained in further detail below), where the referenced library of digital images 140 comprises references to the locations of each of the digital images on digital image store 150.

In step 420, each of the plurality of digital images is moved to new location. Step 420 may be performed by the photographer moving the plurality of digital images from an existing location to a new location, e.g., each of the plurality of digital images may be moved to a new location at digital image store 150.

In an embodiment, each of the plurality of digital images may be moved in step 420 during a point in time when the initial location of each of the plurality of digital images is not accessible by application 120 over communications link 160. For example, the photographer may disconnect his laptop from the network when working on location. In this example, digital image store 150 will be inaccessible to application 120 since computer system 112 will not be connected to communications link 160.

In step 430, application 120 updates the location data of step 410 to identify that each of the plurality of digital images are each currently stored at a new location in response to determining that one digital image, of the plurality of digital images, is stored at a new location. Step 430 may be performed in response to digital image store 150 becoming accessible to application 120. For example, once the photographer reconnects his laptop to the network when he arrives home, his laptop (in this example his laptop corresponds to computer system 112) is connected to communications link 160 and therefore, digital image store 150 becomes accessible to computer system 110.

In an embodiment, if a digital image has been moved to a new location on the same file system, then application 120 may update the location data to identify the new location of a moved digital image based on the file alias for the moved digital image. As the file alias used by the file system to identify the digital image does not change when the digital image is moved to a new location managed by the file system, embodiments of the invention may update the location data using the file alias to determine that the moved digital image is the same digital that was previously stored in a different location.

In an embodiment, once digital image store 150 becomes accessible to application 120, application 120 accesses information that identifies all the digital images that are stored on digital image store 150. Once application 120 is informed of all the digital images that are stored on digital image store 150, application 120 may consult the location data to ensure that each of those digital images has not been moved from the location identified by the location data. In this way, application 120 may quickly identify, since the digital image store 150 was last accessible to application 120, which digital images previously stored on digital image store 150 have moved locations and which digital images previously stored on digital image store 150 have not moved locations.

In an embodiment, the user may specifically identify to application 120 where one digital image has moved. Prior to doing so, application 120 may offer one or more suggestions to the user based on an analysis of similarities between the digital images that application 120 has identified as being moved and digital images which application 120 discovers as being in a location where application 120 did not anticipate such digital images being.

In an embodiment, once a user identifies where one of the plurality of digital images has moved, application 120 may update the location data to identify where each of the plurality of digital images have moved. According to one approach for doing so, application 120 may determine where each of the plurality of digital images has moved based on a comparison of the path from the prior location to the new location for the digital image whose movement was verified by the user. To illustrate, if application 120 determines that a particular folder was moved from a first location to a second location, then application 120 may update the location of all digital images and/or folders logically stored in the moved folder to reflect the new location of the moved folder.

As a result of performing the steps of FIG. 4, if five hundred digital images are moved in the same manner, rather than the photographer manually updating application 120 with the knowledge of where each of the five hundred digital images are currently located, the photographer may simply inform application 120 about how one of the digital images has been moved, and application 120 will automatically determine how the other four hundred and ninety-nine digital images moved, thereby saving the photographer time and frustration and increasing the accuracy of updating application 120.

Having described an approach for tracking locations of digital images, an approach for managing a library of digital images according to an embodiment of the invention will now be discussed.

Storing Digital Images Anywhere

Figure 5:
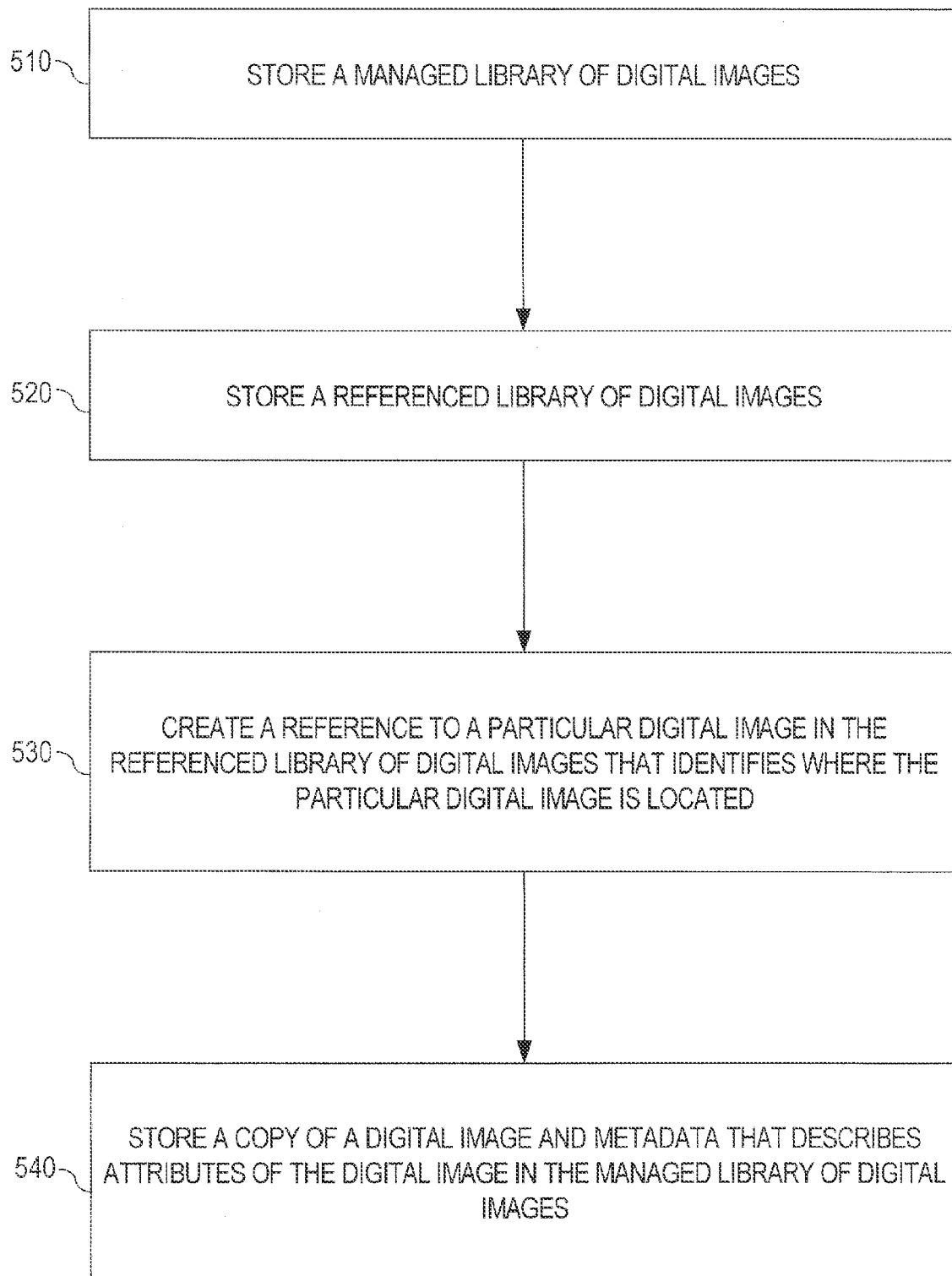
FIG. 5 is a flowchart illustrating the functional steps of managing a library of digital images according to an embodiment of the invention.

FIG. 5 is a flowchart illustrating the functional steps of managing a library of digital images according to an embodiment of the invention. By performing the steps of FIG. 5, embodiments of the invention enable digital images, which are managed by application 120, to be moved from managed library of digital images 130 to referenced library of digital images 140, and vice-versa. Accordingly, application 120 may manage digital images stored in either managed library of digital images 130 or referenced library of digital images 140, thereby reaping the best of both worlds. For ease of explanation, the steps of FIG. 5 are illustrated as being sequential; however, steps 530 and 540 are optional, and may be performed in any order and at any time after the performance of steps 510 and 520 by embodiments of the invention.

In step 510, managed library of digital images 130 is stored or established by application 120. For example, step 510 may be performed by storing or establishing managed library of digital images 130 in system 100.

In step 520, referenced library of digital images 140 is stored or established by application 120. For example, step 520 may be performed by storing or establishing referenced library of digital images 140 in system 100.

In step 530, management of a digital image is transferred from managed library of digital images 130 to referenced library of digital images 140. In an embodiment, the performance of step 530 is referred to as relocation.

In an embodiment, step 530 may be performed in response to application 120 receiving a request to move a particular digital image from managed library of digital images 130 to referenced library of digital images 140. Relocation of the digital image may be performed by creating a reference to the digital image in referenced library of digital images 140. The reference identifies, to referenced library of digital images 140, where the digital image is located.

In step 540, management of a digital image is transferred from referenced library of digital images 140 to managed library of digital images 130. In an embodiment, the performance of step 540 is referred to as consolidation.

In an embodiment, step 540 may be performed in response to application 120 receiving a request to move a particular digital image from referenced library of digital images 140 to managed library of digital images 130. Consolidation of the digital image may be performed by storing a copy of the digital image and metadata that describes attributes of the digital image in managed library of digital images 130.

In an embodiment, in response to application 120 receiving a request to update the location of a particular digital image from a first location in referenced library of digital images 140 to a second location in referenced library of digital images 140, application 120 updates a reference to the particular digital image in referenced library of digital images 140 to identify the second location.

Figure 6:
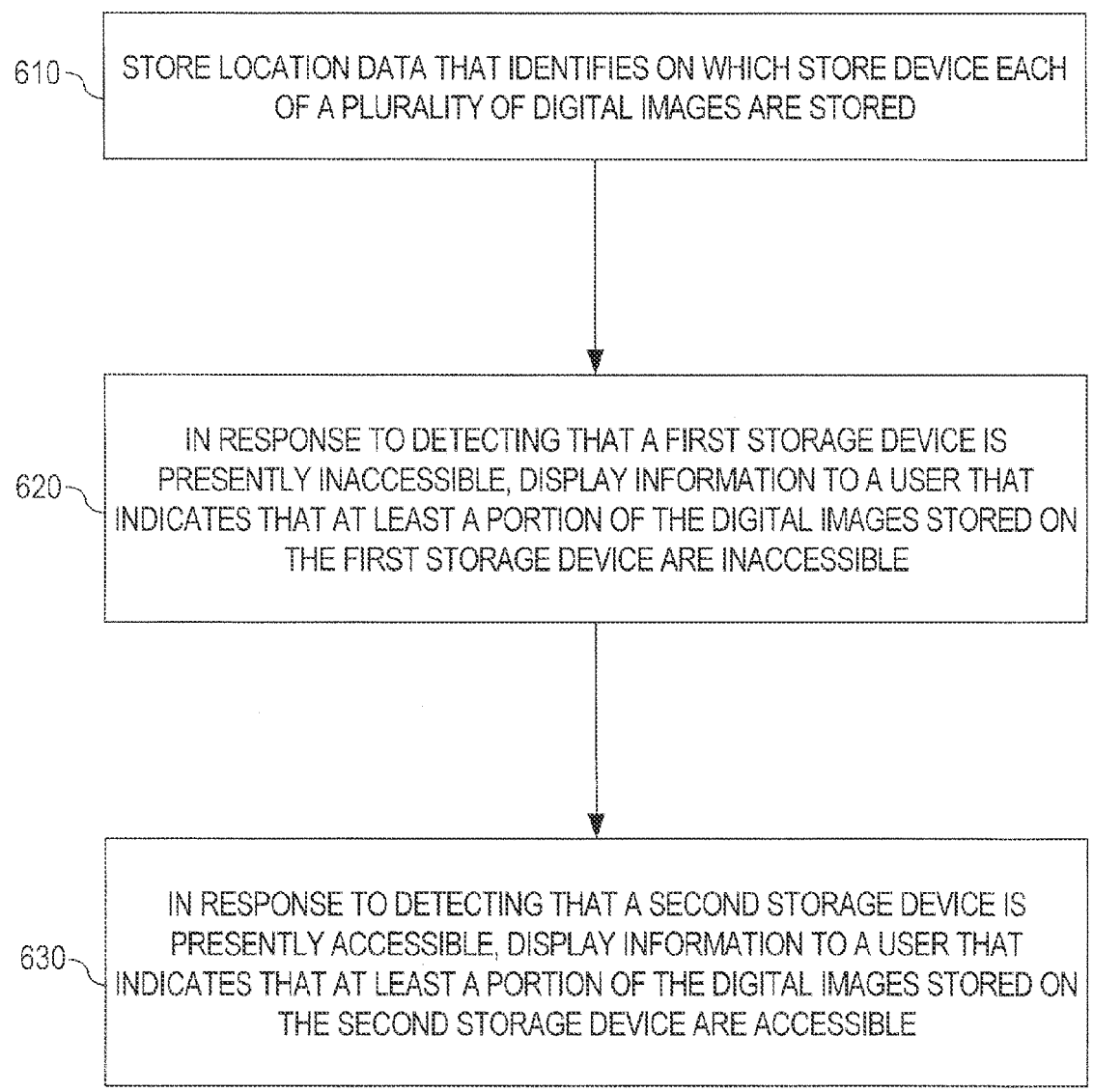
FIG. 6 is a flowchart illustrating the functional steps of managing the location of a plurality of digital images according to an embodiment of the invention.

FIG. 6 is a flowchart illustrating the functional steps of managing the location of a plurality of digital images according to an embodiment of the invention. By performing the steps of FIG. 6, once a determination is made by application 120 that a particular storage device is inaccessible, the set of digital images stored thereon that are inaccessible may be immediately displayed to the user without application 120 determining, for each digital image of the plurality of digital images, as to whether the digital image is accessible or not, thereby saving time and resources.

In step 610, location data is stored by application 120. In an embodiment, location data is data that identifies on which storage device each of a plurality of digital images is stored.

In step 620, in response to application 120 detecting that a first storage device, of said plurality of storage devices, that was previously accessible is presently inaccessible, application 120 performs certain actions. To illustrate, application 120 accesses the location data stored in step 610 to determine which digital images, of the plurality of digital images, are stored on the first storage device. For example, if application detects that digital image store 152, which was previously accessible becomes inaccessible, then application 120 may access location data to determine which digital images are stored on digital image store 152. Thereafter, application 120 displays information to a user that indicates that at least of portion of the digital images that are stored on digital image store 152 are presently inaccessible. In this way, by determining that digital image store 152 is inaccessible, application 120 may determine that the digital images which are known to be stored on digital image store 152 are consequently inaccessible without making an individual determination, for each digital image stored on digital image store 152, whether the digital image is accessible or not. In this way, time and resources may be saved.

In step 630, in response to application 120 detecting that a first storage device, of said plurality of storage devices, that was previously inaccessible is presently accessible, application 120 performs certain actions. To illustrate, in an embodiment, application 120 accesses the location data stored in step 610 to determine which digital images, of the plurality of digital images, are stored on the first storage device. For example, if application detects that digital image store 152, which was previously inaccessible becomes accessible, then application 120 may access location data to determine which digital images are stored on digital image store 152. Thereafter, application 120 displays information to a user that indicates that at least of portion of the digital images that are stored on digital image store 152 are presently accessible. In this way, by determining that digital image store 152 is currently accessible, application 120 may determine that the digital images which are known to be stored on digital image store 152 are consequently accessible without making an individual determination, for each digital image stored on digital image store 152, whether the digital image is accessible or not. In this way, time and resources may be saved.

Implementing Mechanisms

Figure 7:
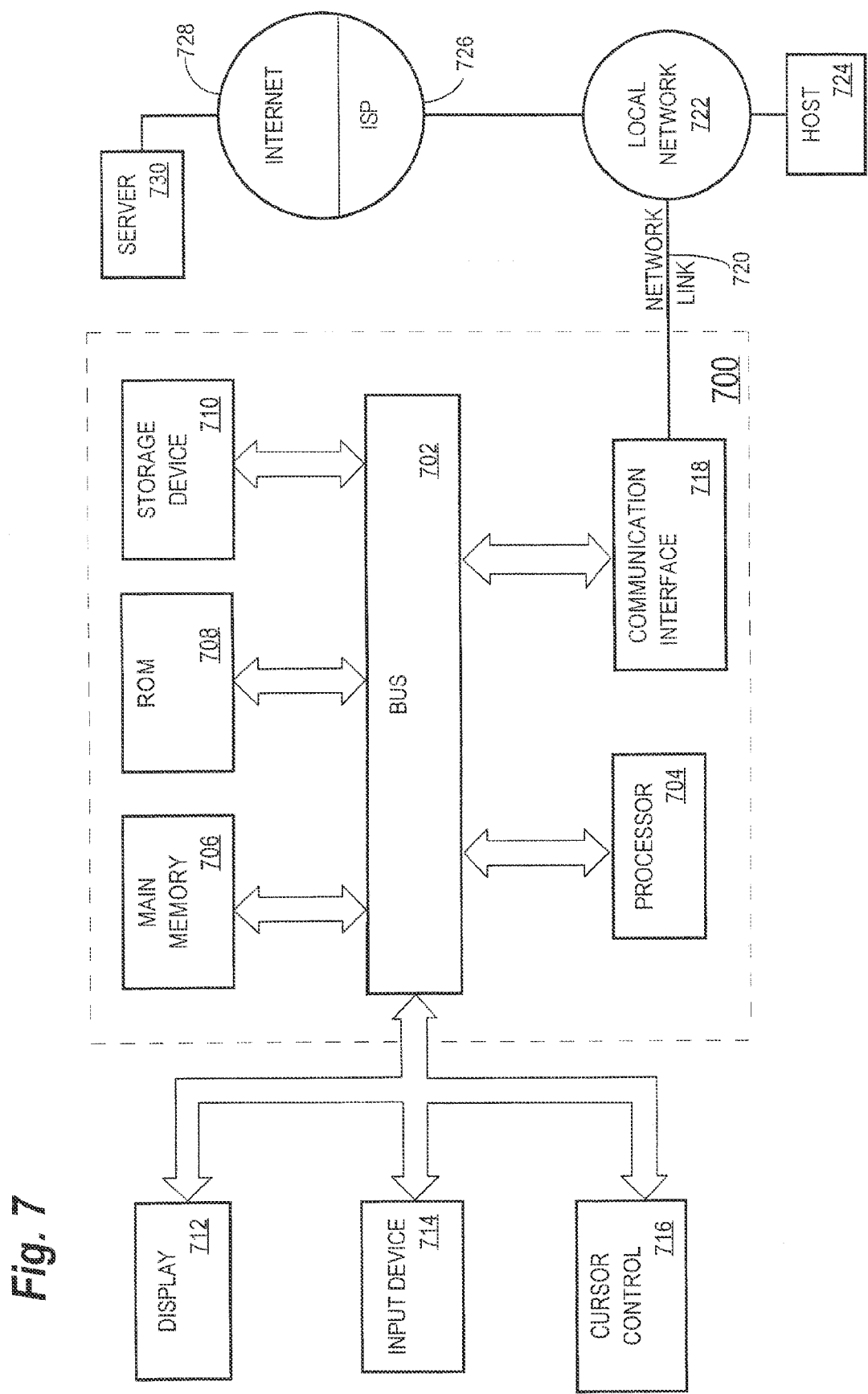
FIG. 7 is a block diagram that illustrates a computer system upon which an embodiment of the invention may be implemented.

FIG. 7 is a block diagram that illustrates a computer system 700 upon which an embodiment of the invention may be implemented. For example, in an embodiment, computer system 110, 112, and/or 114 may correspond to computer system 700. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A method for managing digital images, comprising:
storing, in a first storage device of a plurality of storage devices, location data that defines an initial storage location for each of a plurality of digital images;
accessing, at the first storage device, the location data to determine that a first digital image of the plurality of digital images is stored on a second storage device of the plurality of storage devices;
detecting that the second storage device is presently inaccessible;
causing, to be displayed on a display device and in response to the second storage device being presently inaccessible, information indicating that the first digital image is inaccessible;
receiving user input that defines an action to be performed on the first digital image, wherein the action includes at least one of renaming the first digital image, importing the first digital image, or moving the first digital image; and
storing the action to be performed on the first digital image in response to the second storage device being inaccessible.

2. The method of claim 1, further comprising:
determining that a second digital image of the plurality of digital images is stored on a third storage device of the plurality of storage devices by accessing the location data;
detecting that the third storage device is presently accessible; and
causing, to be displayed on the display device and in response to the third storage device being presently accessible, information indicating that the second digital image is accessible.

3. The method of claim 1, further comprising:
detecting that the second storage device, which was previously inaccessible, is presently accessible; and
causing, to be displayed on the display device and in response to the second storage device being presently accessible, information indicating that the first digital image is accessible.

4. A method for managing digital images, comprising:
storing, in a first storage device of a plurality of storage devices, location data that defines an initial storage location for each of a plurality of digital images;
accessing, at the first storage device, the location data to determine whether a first digital image of the plurality of digital images is stored on a second storage device of the plurality of storage devices;
detecting that the second storage device is presently inaccessible;
causing, to be displayed on a display device and in response to the second storage device being presently inaccessible, information indicating that the first digital image is inaccessible;
receiving an instruction to perform an action with respect to the first digital image;
determining one or more second digital images of the plurality of digital images defined by sharing at least one characteristic of the first digital image;
performing the action on each accessible digital image of the one or more second digital images; and
storing the action to be performed on each inaccessible digital image of the one or more second digital images in response to detecting that the second storage device is inaccessible.

5. The method of claim 4, further comprising:
determining that one or more of the previously inaccessible digital images is presently accessible; and
performing the previously stored action on the one or more previously inaccessible digital images.

6. The method of claim 4, wherein the action comprises at least one of:
renaming the first digital image;
importing the first digital image; or
moving the first digital image from the initial location to a second location.

7. The method of claim 4, wherein the characteristic comprises at least one of metadata, location data, file name, or storage location.

8. The method of claim 1, wherein:
the initial storage location for each of the plurality of digital images identifies on which storage device, of the plurality of storage devices, each of the plurality of digital images is stored.

9. The method of claim 2, further comprising:
receiving user input that defines an action to be performed on the second digital image, wherein the action is at least one of renaming the second digital image, importing the second digital image, or moving the second digital image; and
automatically performing the action on the second digital image in response to the third storage device being presently accessible.

10. The method of claim 1, further comprising:
determining that one or more second digital images of the plurality of digital images is currently stored at a different location than the second storage device where the first digital image is stored; and
updating the location data to identify that each digital image of the one or more second digital images is currently stored at the different location.

11. A non-transitory computer readable medium, comprising instructions for managing digital images that, when executed by one or more processors, cause the one or more processors to:
store, in a first storage device of a plurality of storage devices, location data that defines an initial storage location for each of a plurality of digital images;
access, at the first storage device, the location data to determine that a first digital image of the plurality of digital images is stored on a second storage device of the plurality of storage devices;
detecting that the second storage device is presently inaccessible; and
cause, to be displayed on a display device and in response to the second storage device being presently inaccessible, information indicating that the first digital image is inaccessible;
receive an instruction to perform an action with respect to the first digital image;
determine one or more second digital images of the plurality of digital images defined by sharing at least one characteristic of the first digital image;

perform the action on each accessible digital image of the one or more second digital images; and store the action to be performed on each inaccessible digital image of the one or more second digital images in response to detecting that the second storage device is inaccessible.

12. The non-transitory computer-readable storage medium of claim 11, further comprising additional instructions that, when executed by the one or more processors, cause the one or more processors to:

determine that a second digital image of the plurality of digital images is stored on a third storage device of the plurality of storage devices by accessing the location data;

detect that the third storage device is presently accessible; and cause, to be displayed on the display device and in response to the third storage device being presently accessible, information indicating that the second digital image is accessible.

13. The non-transitory computer-readable medium of claim 11, further comprising additional instructions that, when executed by the one or more processors, cause the one or more processors to:

determine that one or more of the previously inaccessible digital images is presently accessible; and perform the previously stored action on the one or more previously inaccessible digital images.

14. The non-transitory computer-readable medium of claim 11, wherein the characteristic comprises at least one of metadata, location data, file name, or storage location.

15. The non-transitory computer-readable storage medium of claim 11, further comprising additional instructions that, when executed by the one or more processors, cause the one or more processors to:

receive user input that defines the action with respect to the first digital image, wherein the action is at least one of renaming the first digital image, importing the first digital image, or moving the first digital image; and automatically store the action in response to determining that the second storage device is inaccessible.

16. The non-transitory computer-readable storage medium of claim 11, further comprising additional instructions that, when executed by the one or more processors, cause the one or more processors to:

determine that one or more third digital images of the plurality of digital images is currently stored at a different location than the second storage device where the first digital image is stored; and update the location data to identify that each of the one or more third digital images is currently stored at the different location.

17. A system comprising:

a first storage device of a plurality of storage devices, the first storage device storing location data that defines an initial storage location for each of a plurality of digital images; and a processor communicatively coupled to the first storage device and configured to:

access, at the first storage device, the location data to determine that a first digital image of the plurality of digital images is stored on a second storage device of the plurality of storage devices;

detecting that the second storage device is presently inaccessible;

cause, to be displayed on a display device and in response to the second storage device being presently inaccessible, information indicating that the first digital image is inaccessible;

receive user input that defines an action to be performed on the first digital image, wherein the action includes at least one of renaming the first digital image, importing the first digital image, or moving the first digital image; and store the action to be performed on the first digital image in response to the second storage device being inaccessible.

18. The system of claim 17, wherein the processor is further configured to:

determine that a second digital image of the plurality of digital images is stored on a third storage device of the plurality of storage devices by accessing the location data;

detect that the third storage device is presently accessible; and cause, to be displayed on the display device and in response to the third storage device being presently accessible, information indicating that the second digital image is accessible.

19. The system of claim 17, further comprising:

detecting that the second storage device, which was previously inaccessible, is presently accessible; and causing, to be displayed on the display device and in response to the second storage device being presently accessible, information indicating that the first digital image is accessible.

20. The system of claim 17, further comprising:

determine one or more second digital images of the plurality of digital images defined by sharing at least one characteristic of the first digital image;

perform the action on each accessible digital image of the one or more second digital images; and store the action to be performed on each inaccessible digital image of the one or more second digital images in response to detecting that the second storage device is inaccessible.

* * * * *